US010067622B2

(12) United States Patent
Hou et al.

(10) Patent No.: US 10,067,622 B2
(45) Date of Patent: Sep. 4, 2018

(54) ELECTRONIC DEVICE AND SINGLE-LAYER MUTUAL-CAPACITANCE TOUCH SCREEN THEREOF

(71) Applicant: FOCALTECH SYSTEMS CO., LTD., Hsinchu (TW)

(72) Inventors: Weijing Hou, Guangdong (CN); Hui Liu, Guangdong (CN); Chao Chen, Guangdong (CN)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 65 days.

(21) Appl. No.: 15/235,072

(22) Filed: Aug. 11, 2016

(65) Prior Publication Data
US 2017/0060304 A1 Mar. 2, 2017

(30) Foreign Application Priority Data

Aug. 31, 2015 (CN) .......................... 2015 2 0670671

(51) Int. Cl.
*G06F 3/044* (2006.01)
(52) U.S. Cl.
CPC .................................... *G06F 3/044* (2013.01)
(58) Field of Classification Search
CPC ............................................ G06F 2203/04103
See application file for complete search history.

(56) References Cited

U.S. PATENT DOCUMENTS

| 8,502,796 B1* | 8/2013 | Yilmaz .................... G06F 3/044 178/18.06 |
| 9,013,643 B2* | 4/2015 | Zhou .................... G02F 1/13338 349/12 |
| 9,391,610 B2* | 7/2016 | Gourevitch ........ H03K 17/9622 |
| 9,740,330 B2* | 8/2017 | Lewis .................... G06F 3/0416 |

(Continued)

FOREIGN PATENT DOCUMENTS

| JP | 2015509245 A | 3/2015 |
| JP | 2015109066 A | 6/2015 |

(Continued)

OTHER PUBLICATIONS

The first office action for JP,2016-163390, dated Mar. 28, 2017.
The first office action for KR10-2018-0108380, dated Apr. 19, 2017.

*Primary Examiner* — Priyank Shah
(74) *Attorney, Agent, or Firm* — U.S. Fairsky LLP; Yue (Robert) Xu (57) ABSTRACT

An electronic device and a single-layer mutual-capacitance touch screen are provided. The touch screen includes multiple sensing electrode groups disposed in a first direction in parallel, multiple bonding pads, multiple first lead wires and multiple second lead wires. The sensing electrode group includes a first unit including multiple first electrodes and a second unit including multiple electrode pairs. The electrode pair includes a second electrode at a first side of the first unit and a third electrode at a second side of the first unit. The first lead wires and the second lead wires connect the first electrodes and the electrode pairs with corresponding bond- (Continued)

ing pads respectively. In any two adjacent electrode pairs, adjacent ends of both two second electrodes and two third electrodes are opposite to the first electrode in the first direction.

18 Claims, 11 Drawing Sheets

(56) References Cited

U.S. PATENT DOCUMENTS

| | | | |
|---|---|---|---|
| 2011/0242027 A1* | 10/2011 | Chang | G06F 3/0412 345/173 |
| 2013/0002588 A1 | 1/2013 | Bae | |
| 2013/0181942 A1 | 7/2013 | Bulea et al. | |
| 2014/0340354 A1* | 11/2014 | Liu | G06F 3/044 345/174 |
| 2014/0340596 A1* | 11/2014 | Kim | G06F 3/044 349/12 |
| 2015/0116254 A1* | 4/2015 | Solven | G06F 3/044 345/174 |
| 2015/0153872 A1 | 6/2015 | Hu et al. | |
| 2016/0018926 A1* | 1/2016 | Nam | G06F 3/044 345/174 |
| 2017/0090625 A1* | 3/2017 | Makino | G06F 3/044 |
| 2017/0228068 A1* | 8/2017 | Pu | G06F 3/044 |

FOREIGN PATENT DOCUMENTS

| | | |
|---|---|---|
| KR | 20080081411 A | 9/2008 |
| KR | 101294341 B1 | 8/2013 |

* cited by examiner

ELECTRONIC DEVICE AND SINGLE-LAYER MUTUAL-CAPACITANCE TOUCH SCREEN THEREOF

CROSS REFERENCE OF RELATED APPLICATION

The present application claims the priority to Chinese Patent Application No. 201520670671.9, titled "ELECTRONIC DEVICE AND SINGLE-LAYER MUTUAL-CAPACITANCE TOUCH SCREEN THEREOF", filed on Aug. 31, 2015 with the State Intellectual Property Office of the PRC, which is incorporated herein by reference in its entirety.

FIELD

The present disclosure relates to the field of touch technology, and particularly to an electronic device and a single-layer mutual-capacitance touch screen thereof.

BACKGROUND

Currently, a capacitive touch screen, as an important component for human-computer interaction, has been widely applied into an electronic product such as a cell phone and a tablet computer. Specifically, a single-layer mutual-capacitance touch screen has been widely applied currently. A touch sensing electrode, a touch drive electrode and electrode wiring of the single-layer mutual-capacitance touch screen are prepared by a transparent electrode in a same layer without over-bridging, thereby achieving a simple fabrication process, low cost and high cost performance. Therefore, the single-layer mutual-capacitance touch screen has attracted increasing public attention, and has been an important development direction of the capacitive touch screen.

Figure 1:
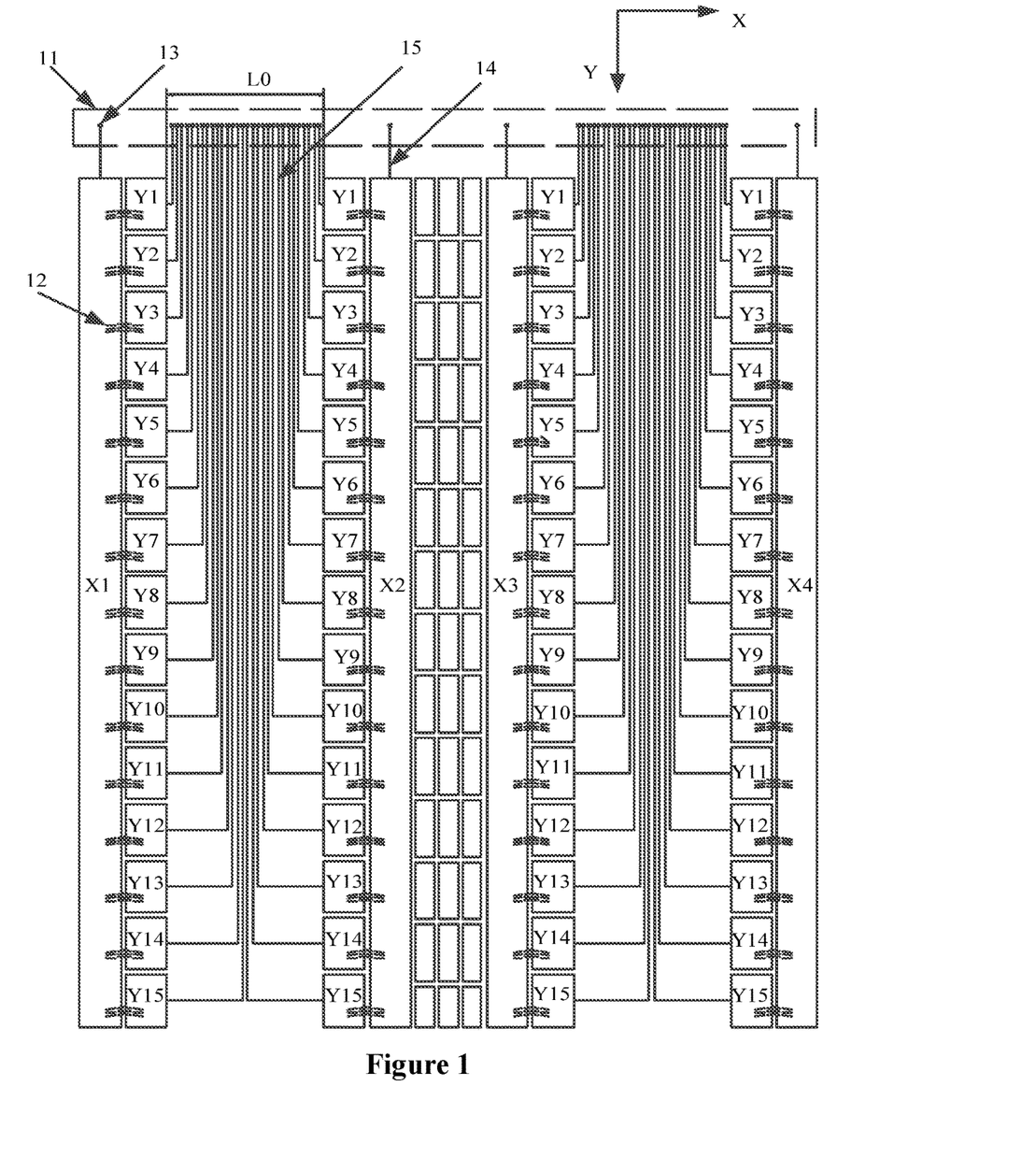
FIG. 1 is a schematic structural diagram of a single-layer mutual-capacitance touch screen common in the conventional technology.

As shown in FIG. 1, an electrode pattern of the current single-layer mutual-capacitance touch screen includes four first electrodes X1 to X4 arranged, in parallel, in an X direction. Each of the first electrodes is coupled with fifteen second electrodes Y1 to Y15 arranged, sequentially, in a Y direction, to form multiple sensing nodes 12. Each of the first electrodes is connected with a bonding pad 13 corresponding to the first electrode by a first lead wire 14 corresponding to the first electrode. Each of the second electrodes is connected with a bonding pad 13 corresponding to the second electrode by a second lead wire 15 corresponding to the second electrode. The bonding pad 13 is connected with an FPC (Flexible Printed Circuit, not shown in FIG. 1). The FPC is connected with a touch chip (not shown in FIG. 1). The touch chip is used to detect a change in capacitance of the sensing node 12, to determine information on a touch position of a user. The bonding pad 13 is disposed within a bonding region 11. The first lead wire 14 and the second lead wire 15 are wiring of the single-layer mutual-capacitance touch screen.

In the single-layer mutual-capacitance touch screen having a set size corresponding to FIG. 1, an electrode pattern in a structure shown in FIG. 1 results in that a width of a wiring blind zone L0 of the single-layer mutual-capacitance touch screen is large, and further that touch precision is poor. Also, the electrode pattern in the structure in FIG. 1 results in that the number of bonding pads and the number of wiring in the single-layer mutual-capacitance touch screen are large, and that fabrication cost is large.

SUMMARY

In order to solve the technical problems described above, the present disclosure provides an electronic device and a single-layer mutual-capacitance touch screen thereof.

In order to realize the objectives described above, the present disclosure provides a technical solution as follows.

A single-layer mutual-capacitance touch screen is provided, which includes multiple sensing electrode groups, multiple bonding pads, multiple first lead wires and multiple second lead wires.

The multiple sensing electrode groups are disposed in a first direction in parallel, each of the sensing electrode groups includes a first unit extending in a second direction and a second unit surrounding the first unit, the first direction is perpendicular to the second direction.

The first unit includes m first electrodes arranged in the second direction, where m is a positive integer greater than 1.

The second unit includes i electrode pairs arranged in the second direction, where i is a positive integer greater than 1, each of the electrode pairs includes a second electrode disposed at a first side of the first unit and a third electrode disposed at a second side of the first unit, a direction directing to the second side from the first side is the first direction, the second electrode is electrically connected with the third electrode.

The first lead wires have a one-to-one correspondence with the first electrodes, and the first lead wires are configured to connect the first electrodes with the bonding pads corresponding to the first electrodes.

The second lead wires have a one-to-one correspondence with the electrode pairs, and the second lead wires are configured to connect the electrode pairs with the bonding pads corresponding to the electrode pairs.

Specifically, in any two adjacent electrode pairs, a gap between two adjacent second electrodes is opposite to one of the first electrodes in the first direction, and a gap between two adjacent third electrodes is opposite to the one of the first electrodes in the first direction.

Preferably, in the single-layer mutual-capacitance touch screen described above, the single-layer mutual-capacitance touch screen may include a first end and a second end, and a direction directing to the second end from the first end may be the second direction.

The multiple bonding pads may be disposed at the first end, and may be arranged in the first direction.

Preferably, in the single-layer mutual-capacitance touch screen described above, for one of the sensing electrode groups:

the first lead wires may be located at one side of the sensing electrode group; and the second lead wires may be located at the other side of the sensing electrode group.

Preferably, in the single-layer mutual-capacitance touch screen described above, shape structures of two adjacent sensing electrode groups may be mirror-symmetrical.

Alternatively, two adjacent sensing electrode groups may have a same shape structure.

Preferably, in the single-layer mutual-capacitance touch screen described above, a part of the first one of the first electrodes may be disposed opposite to the entirety of the first one of the second electrodes in the first direction, and may be disposed opposite to the entirety of the first one of the third electrodes in the first direction.

Alternatively, the entirety of the first one of the first electrodes may be disposed opposite to a part of the first one of the second electrodes in the first direction, and may be disposed opposite to a part of the first one of the third electrodes in the first direction.

Preferably, in the single-layer mutual-capacitance touch screen described above, a part of the m-th one of the first electrodes may be disposed opposite to the entirety of the i-th one of the second electrodes in the first direction, and may be disposed opposite to the entirety of the i-th one of the third electrodes in the first direction.

Alternatively, the entirety of the m-th one of the first electrodes may be disposed opposite to a part of the i-th one of the second electrodes in the first direction, and may be disposed opposite to a part of the i-th one of the third electrodes in the first direction.

Preferably, in the single-layer mutual-capacitance touch screen described above, each of the first electrodes may be in a shape of rectangle Preferably, in the single-layer mutual-capacitance touch screen described above, two adjacent first electrodes in the first unit may be disposed partially opposite to each other in the first direction.

Preferably, in the single-layer mutual-capacitance touch screen described above, each of the first electrodes may include a first plane electrode extending in the second direction and a second plane electrode extending in the second direction.

The first plane electrode may be connected with the second plane electrode, and a width of the second plane electrode may be less than a width of the first plane electrode in the first direction.

Two adjacent first electrodes may be disposed partially opposite to each other in the first direction by the second plane electrodes of the two adjacent first electrodes.

Preferably, in the single-layer mutual-capacitance touch screen described above, each of the first plane electrode and the second plane electrode may be in a shape of rectangle.

The present disclosure further provides an electronic device including any one of the single-layer mutual-capacitance touch screens described above.

It can be seen from the technical solution described above that, the single-layer mutual-capacitance touch screen provided in the present disclosure includes multiple sensing electrode groups, multiple bonding pads, multiple first lead wires and multiple second lead wires. The sensing electrode groups are disposed in the first direction in parallel, and each of the sensing electrode groups includes a first unit extending in the second direction and a second unit surrounding the first unit. The first direction is perpendicular to the second direction. The first unit includes m first electrodes arranged in the second direction, where m is a positive integer greater than 1. The second unit includes i electrode pairs arranged in the second direction, where i is a positive integer greater than 1. Each of the electrode pairs includes a second electrode disposed at a first side of the first unit and a third electrode disposed at a second side of the first unit. A direction directing to the second side from the first side is the first direction. The second electrode is electrically connected with the third electrode. The first lead wires have a one-to-one correspondence with the first electrodes, and the first lead wires are configured to connect the first electrodes with the bonding pads corresponding to the first electrodes. The second lead wires have a one-to-one correspondence with the electrode pairs, and the second lead wires are configured to connect the electrode pairs with the bonding pads corresponding to the electrode pairs. Specifically, in two adjacent electrode pairs, adjacent ends of two second electrodes are opposite to one of the first electrodes in the first direction, and adjacent ends of two third electrodes are opposite to the one of the first electrodes in the first direction.

It can be seen that, in the single-layer mutual-capacitance touch screen described above, in two adjacent electrode pairs, adjacent ends of two second electrodes are opposite to the first electrode in the first direction, and adjacent ends of two third electrodes are opposite to the first electrode in the first direction. In this way, the number of sensing nodes is increased, and the number of lead wires is reduced without reducing the number of sensing nodes compared with the conventional technology. Also, reducing the number of lead wires can lead to reduce a width of a blind zone, improve touch precision, reduce the number of bonding pads and reduce cost.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Apparently, the drawings in the following description illustrate the embodiments of the present disclosure. For those skilled in the art, other drawings can also be obtained according to the drawings without any creative work.

DETAILED DESCRIPTION OF THE EMBODIMENTS

Hereinafter, the technical solution in the embodiments of the present disclosure will be described clearly and completely in conjunction with the drawings in the embodiments of the present disclosure. Apparently, the described embodiments are only a part rather than all of the embodiments of the present disclosure. All the other embodiments obtained by those skilled in the art based on the embodiments of the present disclosure without creative work will fall within the scope of protection of the present disclosure.

Figure 2:
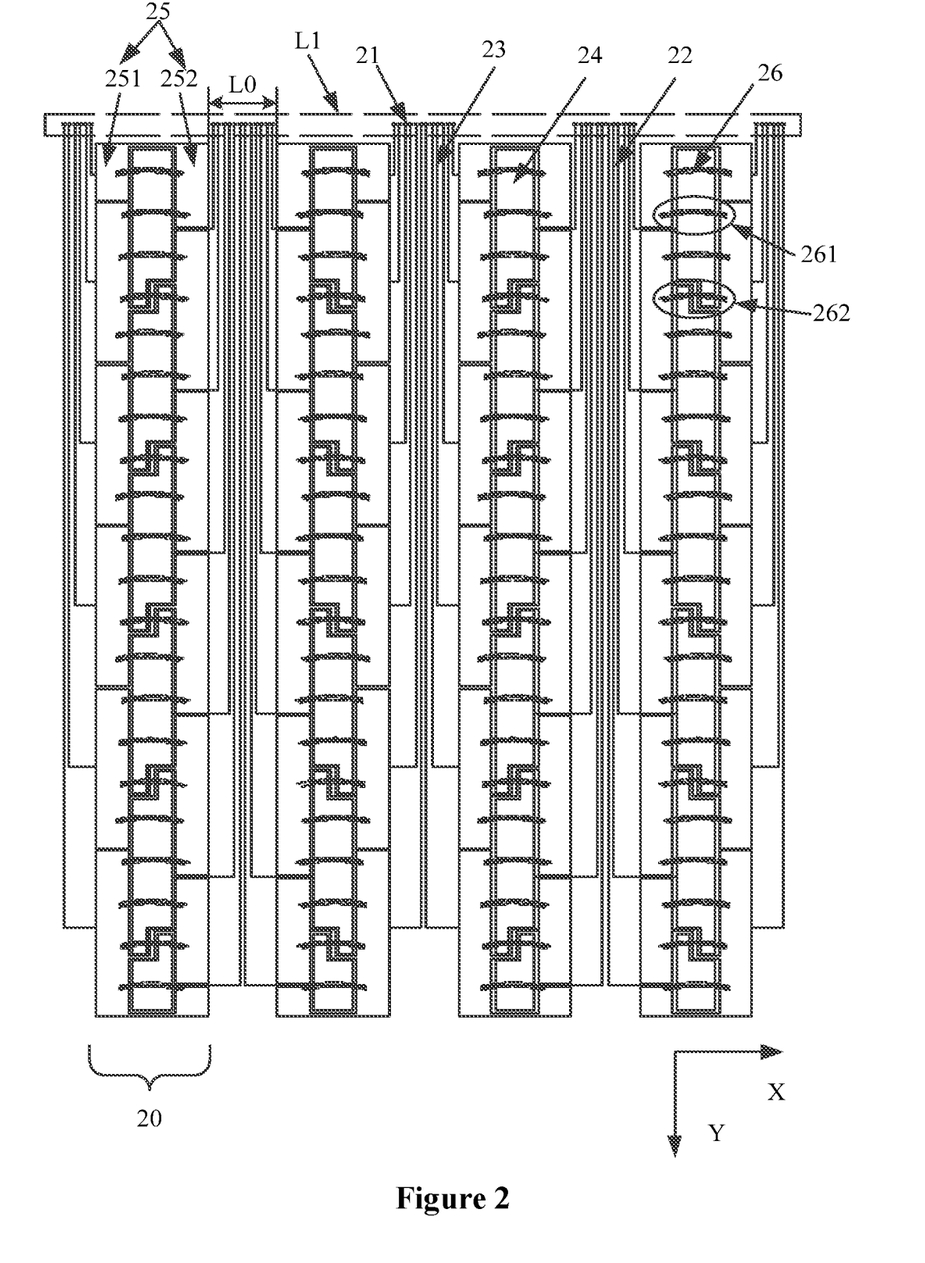
FIG. 2 is a schematic structural diagram of a single-layer mutual-capacitance touch screen according to an embodiment of the present disclosure.

With reference to FIG. 2, which is a schematic structural diagram of a single-layer mutual-capacitance touch screen according to an embodiment of the present disclosure, the single-layer mutual-capacitance touch screen includes multiple sensing electrode groups 20, multiple bonding pads 21, multiple first lead wires 22 and multiple second lead wires 23.

The multiple sensing electrode groups 20 are disposed in a first direction X in parallel. Each of the sensing electrode groups 20 includes a first unit extending in a second direction Y and a second unit surrounding the first unit. The first direction X is perpendicular to the second direction Y The first unit includes m first electrodes 24 arranged in the second direction Y, where m is a positive integer greater than 1.

The second unit includes i electrode pairs 25 arranged in the second direction Y, where i is a positive integer greater than 1. Each of the electrode pairs 25 includes a second electrode 251 disposed at a first side of the first unit and a third electrode 252 disposed at a second side of the first unit. A direction directing to the second side from the first side is the first direction X.

In one of the electrode pairs 25, the second electrode 251 is electrically connected with the third electrode 252.

The first lead wires 22 have a one-to-one correspondence with the first electrodes 24, and the first lead wires 22 are configured to connect the first electrodes 24 with the bonding pads 21 corresponding to the first electrodes 24.

The second lead wires 23 have a one-to-one correspondence with the electrode pairs 25, and the second lead wires 23 are configured to connect the electrode pairs 25 with the bonding pads 21 corresponding to the electrode pairs 25.

In one of the sensing electrode groups 20, two adjacent first electrodes 24 are insulated, two adjacent second electrodes 251 are insulated, and two adjacent third electrodes 252 are insulated. Since that the single-layer mutual-capacitance touch screen is provided in the embodiment of the present disclosure, the first electrode 24, the second electrode 251 and the third electrode 252 are prepared in a transparent conductive layer and are located in a same plane. Therefore, a gap exists between two adjacent first electrodes 24, a gap exists between two adjacent second electrodes 251, and a gap exists between two adjacent third electrodes 252.

Specifically, for any two adjacent electrode pairs in the second direction Y, a gap between two adjacent second electrodes 251 is opposite to one of the first electrodes 24 in the first direction X, and a gap between two adjacent third electrodes 252 is opposite to the one of the first electrodes 24 in the first direction X.

In the embodiment of the present disclosure, one first electrode 24 is disposed opposite to the two adjacent electrode pairs 25 in the first direction X, thereby increasing the number of sensing nodes 26. In this way, the embodiment of the present disclosure can reduce the number of lead wires without reducing the number of the sensing nodes 26 compared with the conventional technology. The reducing the number of lead wires can lead to reduce a width of a blind zone L0, improve touch precision, reduce the number of bonding pads 21 and reduce cost. Also, the reducing the number of bonding pads 21 can lead to shorten a length of a bonding region L1, further reduce a working length of an FPC and reduce the cost.

Optionally, the single-layer mutual-capacitance touch screen includes a first end and a second end. A direction directing to the second end from the first end is the second direction Y. The multiple bonding pads 21 are disposed at the first end, and are arranged in the first direction. For one of the sensing electrode groups 20, the first lead wires 22 are located at one side of the sensing electrode group 20, and the second lead wires 23 are located at the other side of the sensing electrode group 20.

All the bonding pads 21 are disposed at a same end, the first lead wires 22 are located at a same side of the sensing electrode group 20, and the second lead wires 23 are located at a same side of the sensing electrode group 20, thereby facilitating layout for the first lead wires 22 and the second lead wires 23 and simplifying fabrication process.

Figure 3:
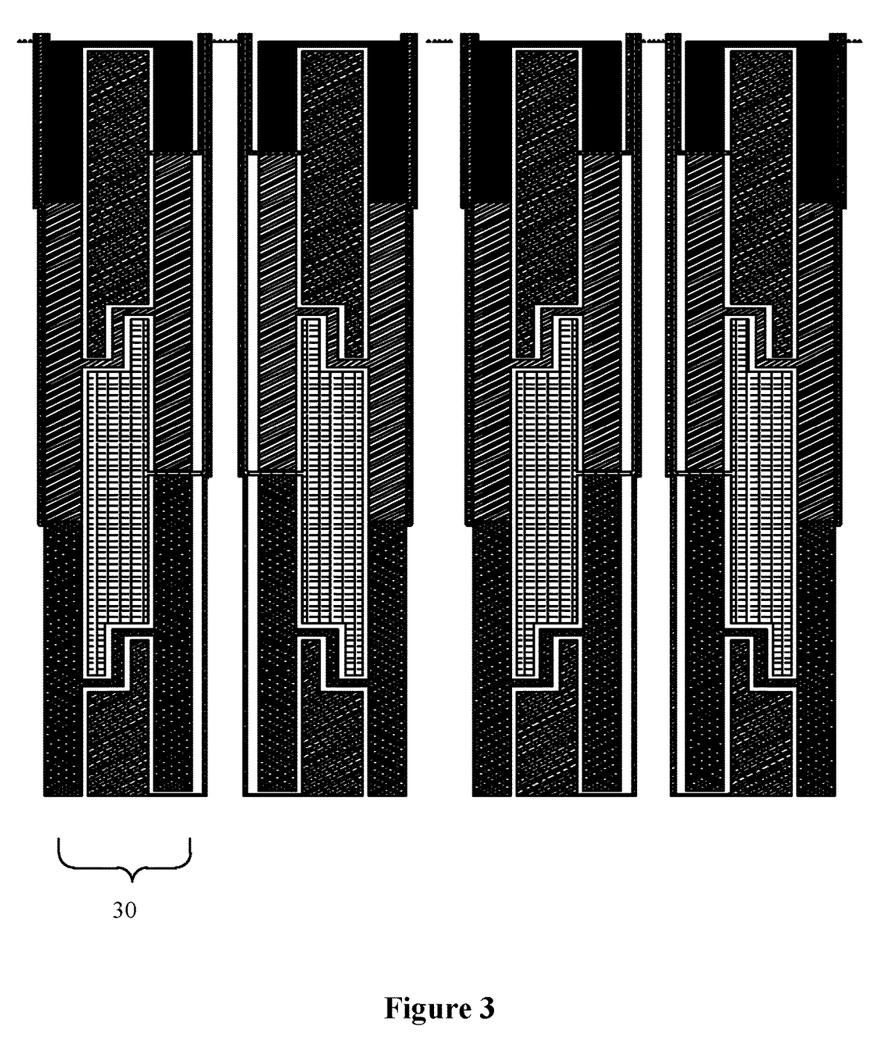
FIG. 3 is a schematic structural diagram of a single-layer mutual-capacitance touch screen according to another embodiment of the present disclosure.

With reference to FIG. 3, which is a schematic structural diagram of a single-layer mutual-capacitance touch screen according to another embodiment of the present disclosure, shape structures of two adjacent sensing electrode groups 30 in the embodiment are mirror-symmetrical. In the embodiment, a structure of the electrode has better symmetry, thereby improving touch linearity.

Figure 4:
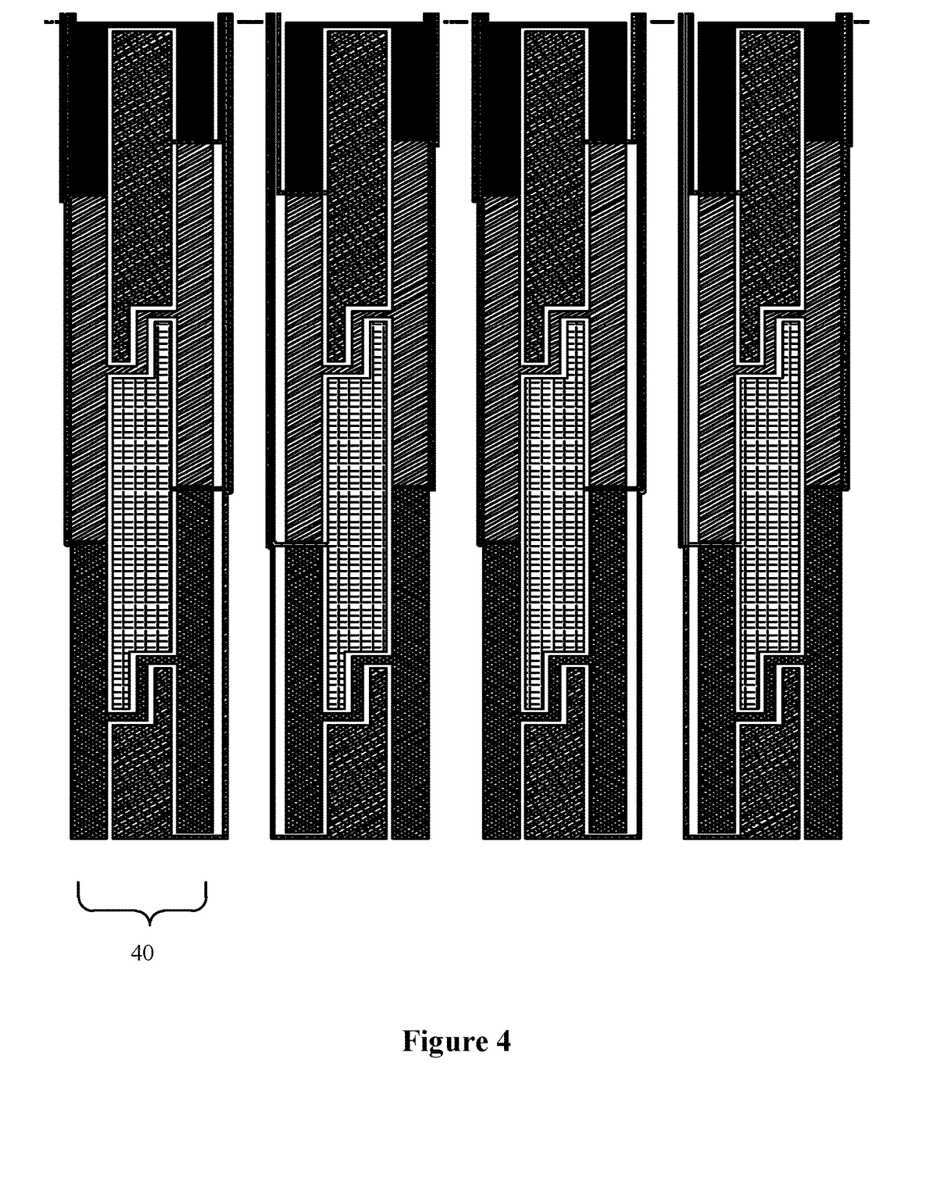
FIG. 4 is a schematic structural diagram of a single-layer mutual-capacitance touch screen according to yet another embodiment of the present disclosure.

With reference to FIG. 4, which is a schematic structural diagram of a single-layer mutual-capacitance touch screen according to yet another embodiment of the present disclosure, two adjacent sensing electrode groups 40 in the embodiment have a same shape structure. In the embodiment, the sensing electrode groups have a same electrode pattern, thereby simplifying fabrication process.

In a sensing electrode group, it is defined that the m first electrodes in the second direction Y are the first one of the first electrodes to the m-th one of the first electrodes sequentially, it is defined that the i electrode pairs in the second direction Y are the first electrode pair to the i-th electrode pair sequentially, it is defined that the i second electrodes in the second direction Y are the first one of the second electrodes to the i-th one of the second electrodes sequentially, and it is defined that the i third electrodes in the second direction Y are the first one of the third electrodes to the i-th one of the third electrodes sequentially. In the embodiments shown in FIG. 2 to FIG. 4, a part of the first one of the first electrodes is disposed opposite to the entirety of the first one of the second electrodes in the first direction, and is disposed opposite to the entirety of the first one of the third electrodes in the first direction. That is, projection of the first one of the first electrodes is partially overlapped with projection of the first one of the second electrodes and is partially overlapped with projection of the first one of the third electrodes in a straight line parallel to the second direction Y. The entirety of the m-th one of the first electrodes is disposed opposite to a part of the i-th one of the second electrodes in the first direction, and is disposed opposite to a part of the i-th one of the third electrodes in the first direction. That is, projection of the m-th one of the first electrodes falls within projection of the i-th one of the third electrodes and falls within projection of the i-th one of the second electrodes in a straight line parallel to the second direction Y. In this case, i is equal to m, as shown in FIG. 2 to FIG. 4.

Figure 5A:
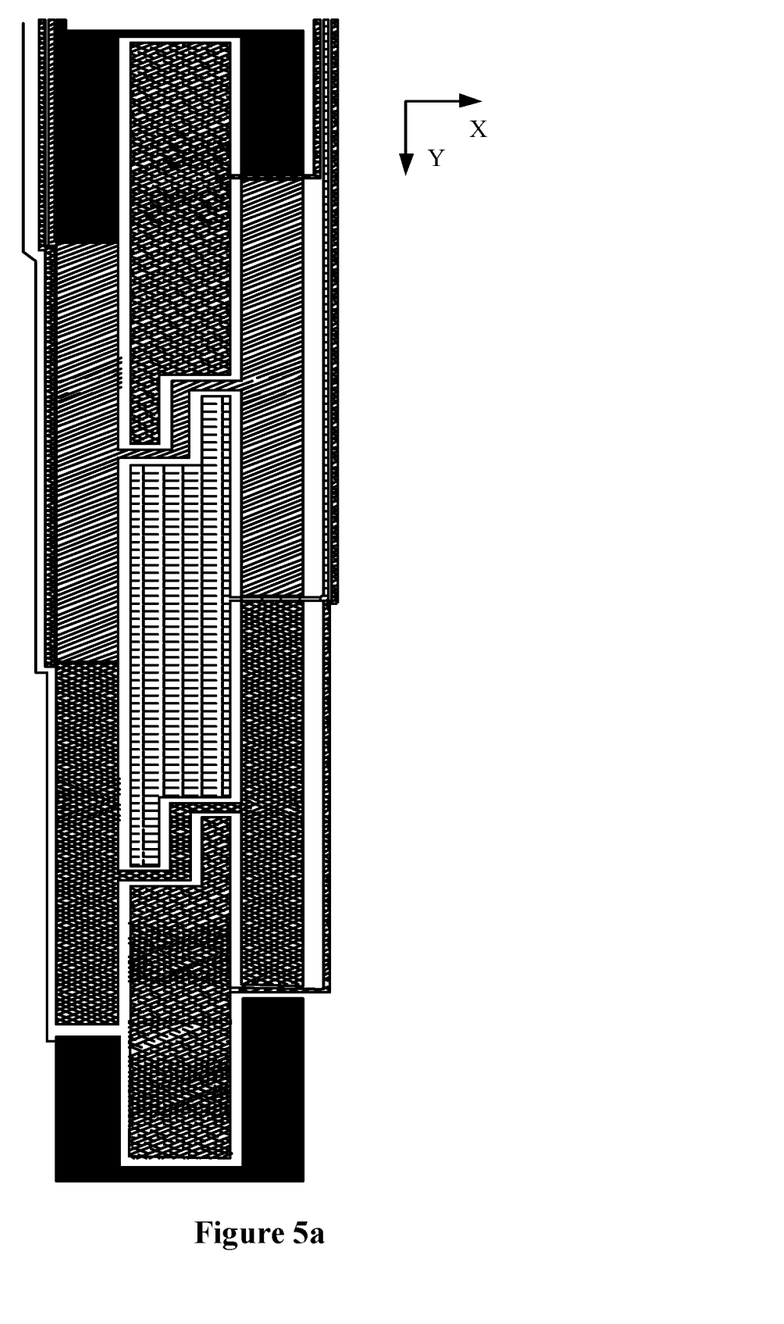
FIG. 5a is a schematic structural diagram of a sensing electrode group according to an embodiment of the present disclosure.

Furthermore, the electrodes may also be disposed as follows. A part of the first one of the first electrodes is disposed opposite to the entirety of the first one of the second electrodes in the first direction, and is disposed opposite to the entirety of the first one of the third electrodes in the first direction, a part of the m-th one of the first electrodes is disposed opposite to the entirety of the i-th one of the second electrodes in the first direction, and is disposed opposite to the entirety of the i-th one of the third electrodes in the first direction. In this case, i is equal to m+1, as shown in FIG. 5a. The opposite disposition for the entirety of electrode and a part of electrode is similar to the description described above.

Figure 5B:
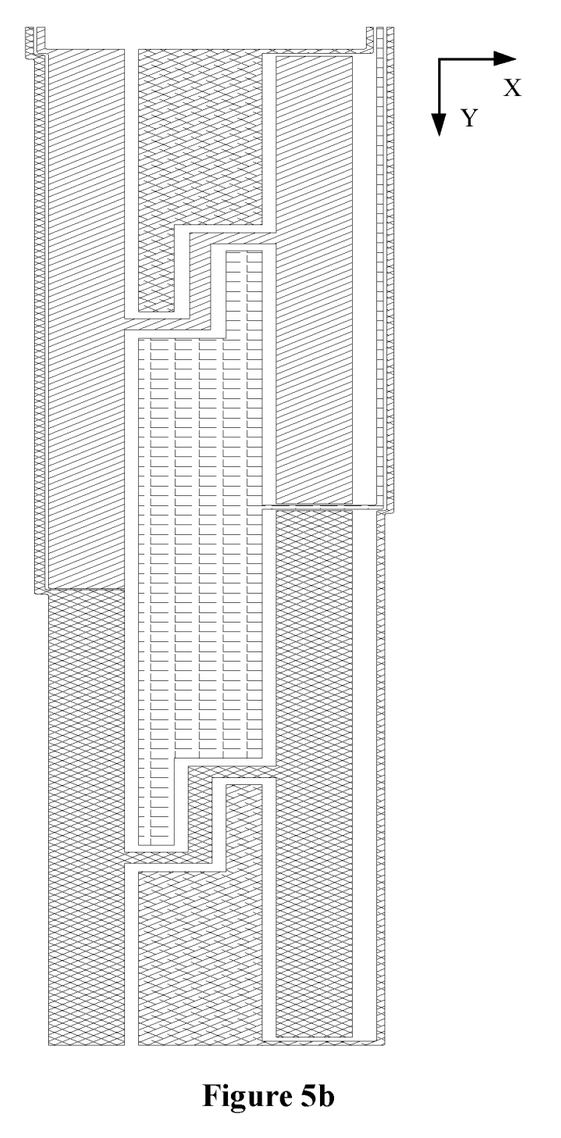
FIG. 5b is a schematic structural diagram of a sensing electrode group according to another embodiment of the present disclosure.

Furthermore, the electrodes may also be disposed as follows. The entirety of the first one of the first electrodes is disposed opposite to a part of the first one of the second electrodes in the first direction, and is disposed opposite to a part of the first one of the third electrodes in the first direction, the entirety of the m-th one of the first electrodes is disposed opposite to a part of the i-th one of the second electrodes in the first direction, and is disposed opposite to a part of the i-th one of the third electrodes in the first direction. In this case, i is equal to m−1, as shown in FIG. 5b. The opposite disposition for the entirety of electrode and a part of electrode is similar to the description described above.

Furthermore, the electrodes may also be disposed as follows. The entirety of the first one of the first electrodes is disposed opposite to a part of the first one of the second electrodes in the first direction, and is disposed opposite to a part of the first one of the third electrodes in the first direction, a part of the m-th one of the first electrodes is disposed opposite to the entirety of the i-th one of the second electrodes in the first direction, and is disposed opposite to the entirety of the i-th one of the third electrodes in the first direction. In this case, i is equal to m, as shown in FIG. 2 to FIG. 4. The opposite disposition for the entirety of electrode and a part of electrode is similar to the description described above.

In the embodiments shown in FIG. 2 to FIG. 4, in one first unit, two adjacent first electrodes are disposed partially opposite to each other in the first direction, thereby further increasing the number of the sensing nodes, and reducing the number of electrodes, reducing the number of lead wires and the number of bonding pads, and narrowing the blind zone and reducing the cost.

Taking FIG. 2 as an example, two adjacent first electrodes 24 have opposite parts in the first direction X, a width of the opposite part is less than a width of the first electrode. 0.5 sensing node (as shown in ellipse 262) can be added by the opposite parts of two adjacent first electrodes 24. One sensing node (as shown in ellipse 261) corresponds to a whole width of the first electrode.

Figure 5C:
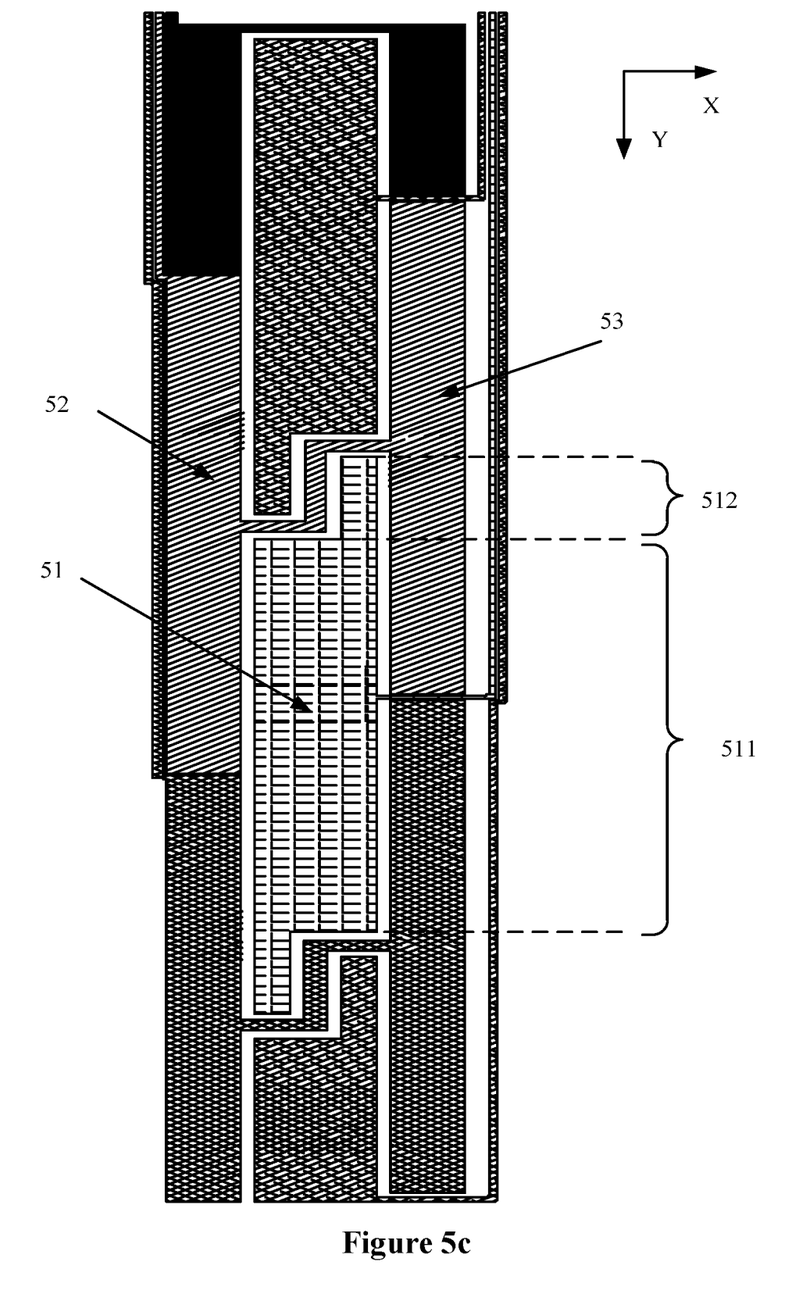
FIG. 5c is a schematic structural diagram of a sensing electrode group according to yet another embodiment of the present disclosure.

In a case that two adjacent first electrodes are disposed partially opposite to each other in the first direction, a structure of the first electrode may be shown in FIG. 5a to FIG. 5c.

Taking FIG. 5c as an example, a first electrode 51 in the sensing electrode group at least includes a first plane electrode 511 extending in the second direction Y and a second plane electrode 512 extending in the second direction Y. The first plane electrode 511 is connected with the second plane electrode 512. A width of the second plane electrode 512 is less than a width of the first plane electrode 511 in the first direction X. Two adjacent first electrodes 51 are disposed partially opposite to each other in the first direction X by the second plane electrodes 512 of the two adjacent first electrodes 51.

Since each of the first plane electrode and the second plane electrode is in a shape of rectangle, and has a simple pattern structure, not only pattern design but also a process procedure are easier, thereby greatly improving an etching yield of a screen plant. Also, since a way of pattern coupling is simple, an optical effect of the pattern is more uniform, and a screen body has good appearance. The second plane electrode extending from an end of the first plane electrode 511 is not limited to be in a shape of rectangle, for example, may also be in a shape of triangle.

In a case that only one first electrode 51 is adjacent to a first electrode 51 in the second direction, the second plane electrode 512 is disposed only at an end of the first electrode 51. In a case that two first electrodes 51 are adjacent to the first electrode 51 in the second direction, two second plane electrodes 512 are disposed at two ends of the first electrode 51, respectively. In the embodiment shown in FIG. 5c, the first electrode 51, the second electrode 52 and the third electrode 53 are in a structure of rectangle, thereby having a simple fabrication process. The second plane electrode 512 extends from one end of the first plane electrode 511, and the second plane electrode 512 and the first plane electrode 511 are in an integration structure.

Furthermore, the electrodes may also be disposed as follows. Two adjacent first electrodes in the second direction Y may not have the opposite parts in the first direction X. In this case, the first electrode is a plane electrode, and a structure of the single-layer mutual-capacitance touch screen may be shown in FIG. 6 to FIG. 8.

Figure 6:
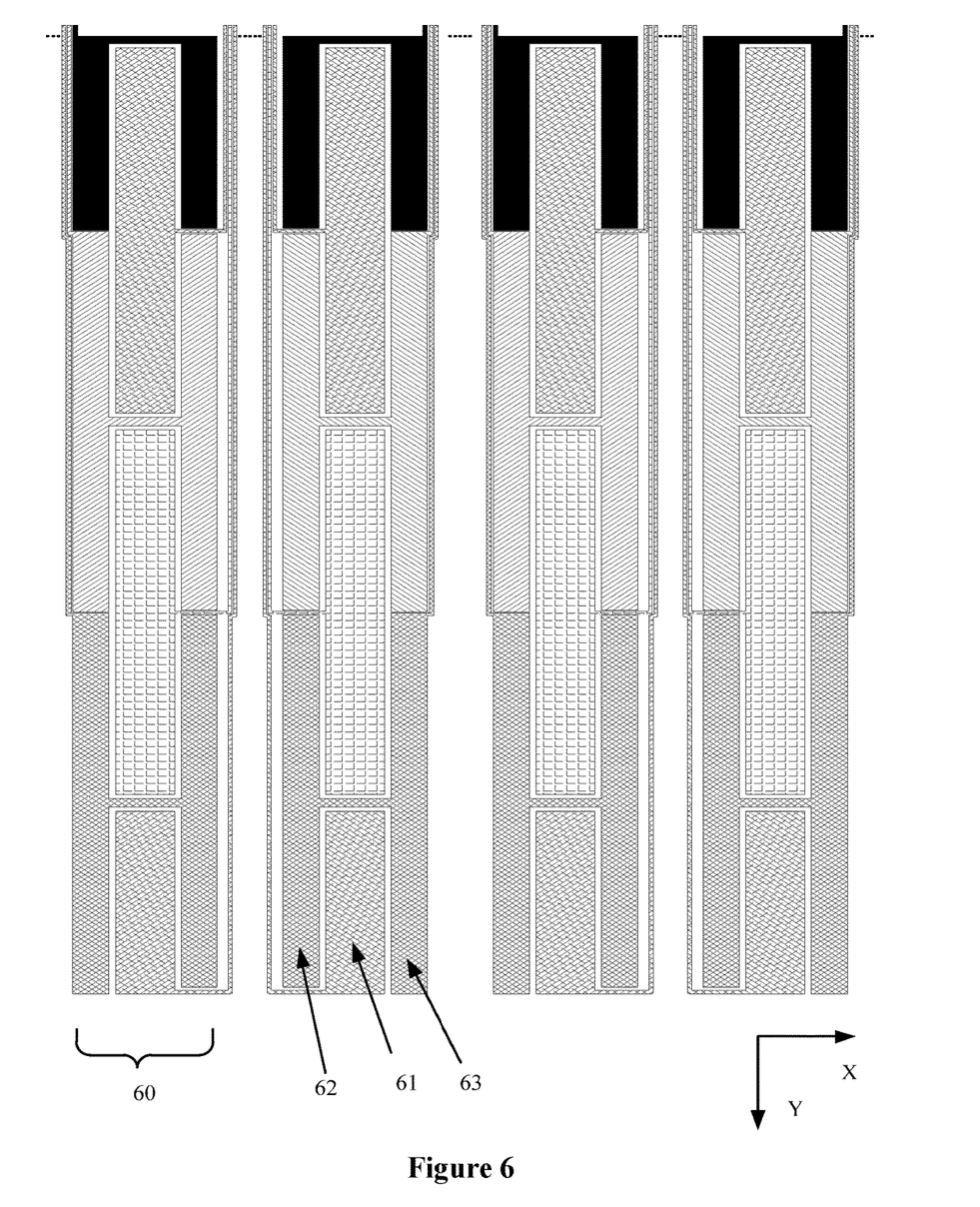
FIG. 6 is a schematic structural diagram of a single-layer mutual-capacitance touch screen according to yet another embodiment of the present disclosure.

With reference to FIG. 6, which is a schematic structural diagram of a single-layer mutual-capacitance touch screen according to yet another embodiment of the present disclosure, a first electrode 61 is a plane electrode, each of a second electrode 62 and a third electrode 63 is a plane electrode. In one electrode pair, the second electrode 62 has a same structure as the third electrode 63, and is disposed symmetrical with the third electrode 63. The sensing electrode groups 60 have a same structure.

Figure 7:
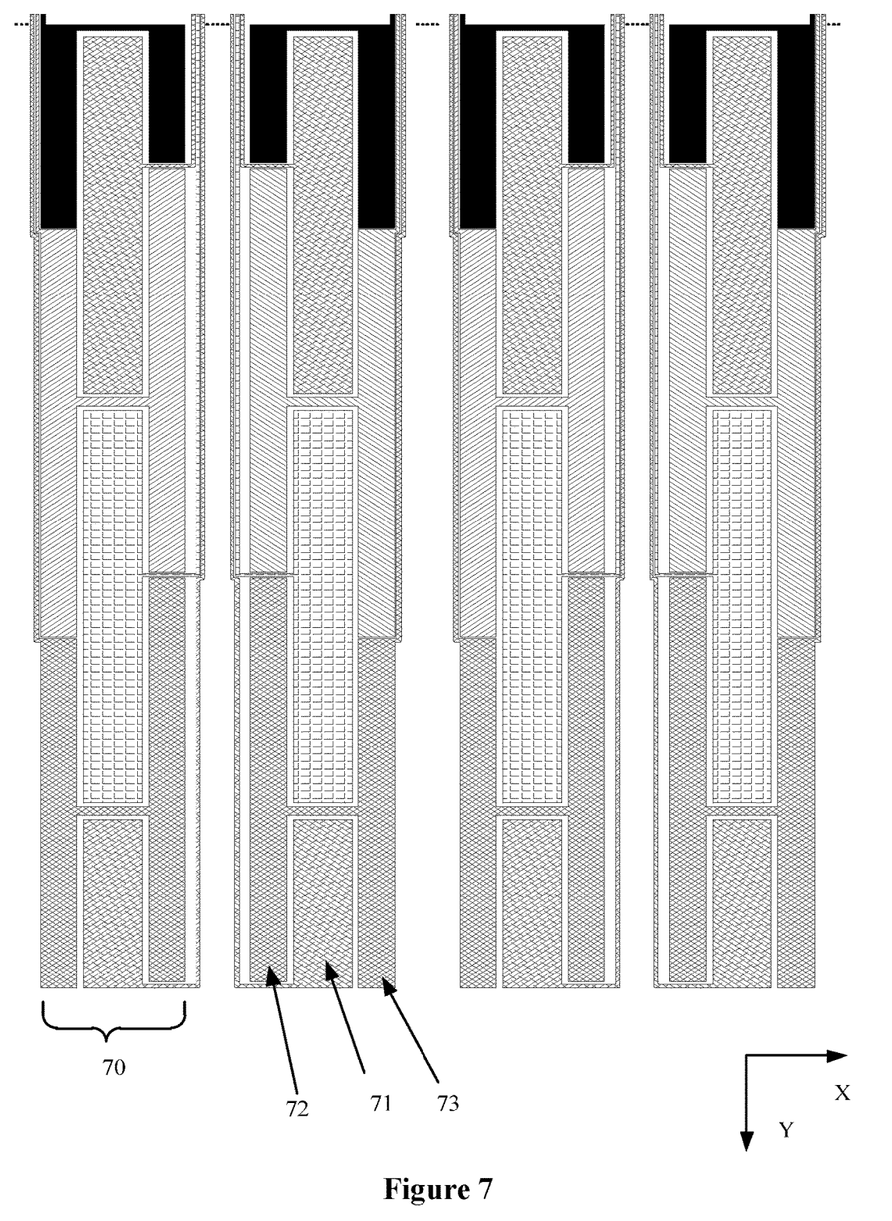
FIG. 7 is a schematic structural diagram of a single-layer mutual-capacitance touch screen according to yet another embodiment of the present disclosure.

With reference to FIG. 7, which is a schematic structural diagram of a single-layer mutual-capacitance touch screen according to yet another embodiment of the present disclosure, a first electrode 71 is a plane electrode, each of a second electrode 72 and a third electrode 73 is a plane electrode. In one electrode pair, the second electrode 72 has a same structure as the third electrode 73, and the second electrode 72 is disposed partially opposite to the third electrode 73 in the first direction X. Structure of two adjacent sensing electrode groups 70 are mirror-symmetrical.

Figure 8:
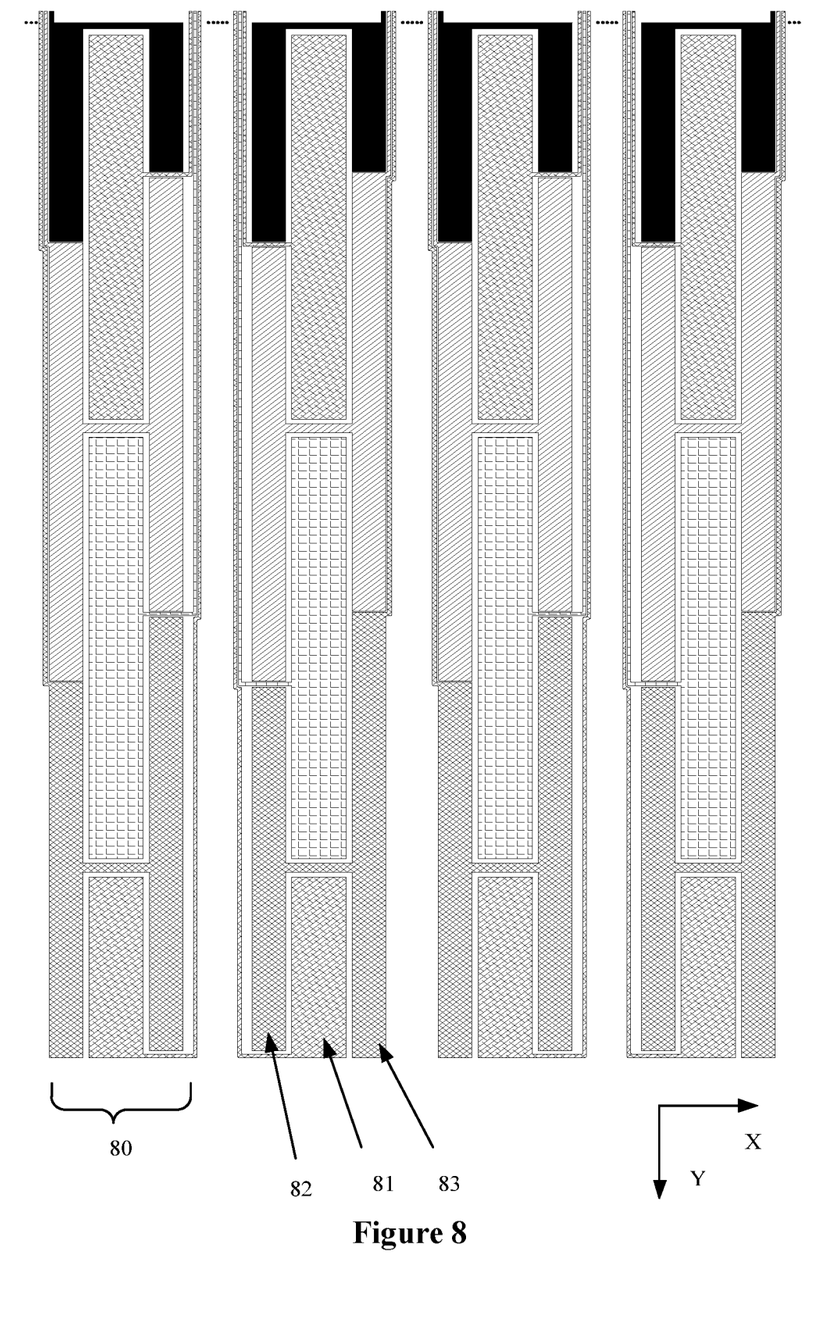
FIG. 8 is a schematic structural diagram of a single-layer mutual-capacitance touch screen according to yet another embodiment of the present disclosure.

With reference to FIG. 8, which is a schematic structural diagram of a single-layer mutual-capacitance touch screen according to yet another embodiment of the present disclosure, a first electrode 81 is a plane electrode, each of a second electrode 82 and a third electrode 83 is a plane electrode. In one electrode pair, the second electrode 82 has a same structure as the third electrode 83, and the second electrode 82 is disposed partially opposite to the third electrode 83 in the first direction X. Structure of two adjacent sensing electrode groups 80 are mirror-symmetrical.

In the single-layer mutual-capacitance touch screen according to the embodiments of the present disclosure, the first lead wire corresponding to the first electrode may be led out from a gap between two adjacent second electrodes or from a gap between two adjacent third electrodes. The lead wire corresponding to the first electrode may also be led out from a slit on the second electrode or the third electrode opposite to the first electrode. A first lead wire corresponding to the first one of the first electrodes may be led to the first end, and a first lead wire corresponding to the m-th one of the first electrodes may be led to the second end.

Hereinafter, advantages of the embodiment of the present disclosure may be illustrated by comparing the embodiment shown in FIG. 1 with the embodiment shown in FIG. 2.

In the embodiment shown in FIG. 1, each of the sensing electrode groups includes fifteen second electrodes and one first electrode. A length of the first electrode may be set to be fifteen pitches. In one sensing electrode group, there are fifteen sensing nodes 12, sixteen lead wires and sixteen bonding pads are required.

In the embodiment shown in FIG. 2, a length of a panel is also set to be fifteen pitches. Each of the sensing electrode groups 20 includes six first electrodes 24, six electrode pairs and 18.5 sensing nodes 26. Specifically, all of the opposite parts of the first electrodes contribute to 2.5 sensing nodes 26. Twelve lead wires and twelve bonding pads 21 are required in one sensing electrode groups 20.

By comparing the embodiment shown in FIG. 1 with the embodiment shown in FIG. 2, the technical solution according to the embodiment of the present disclosure can increase the number of sensing nodes, reduce the number of lead wires and the number of bonding pads, thereby shortening a width of a blind zone, improving touch precision and reducing cost.

Figure 9:
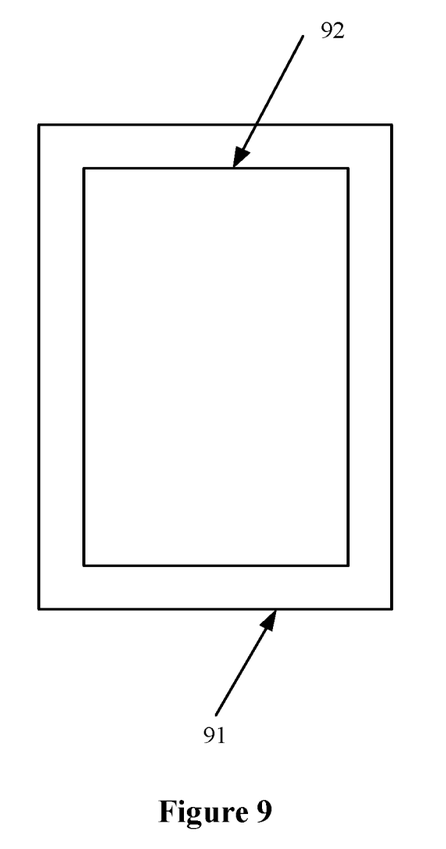
FIG. 9 is a schematic structural diagram of an electronic device according to an embodiment of the present disclosure.

An electronic device is further provided in an embodiment of the present disclosure, with reference to FIG. 9, which is a schematic structural diagram of an electronic device according to an embodiment of the present disclosure, the electronic device 91 includes the single-layer mutual-capacitance touch screen 92 according to the embodiments described above.

The electronic device may be any electronic device having a touch screen. The electronic device has low fabrication cost and high touch precision.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A single-layer mutual-capacitance touch screen, comprising: a plurality of sensing electrode groups, a plurality of bonding pads, a plurality of first lead wires and a plurality of second lead wires; wherein
the plurality of sensing electrode groups are disposed in a first direction in parallel, each of the sensing electrode groups comprises a first unit extending in a second direction and a second unit surrounding the first unit, wherein the first direction is perpendicular to the second direction;
the first unit comprises m first electrodes arranged in the second direction, where m is a positive integer greater than 1;
the second unit comprises i electrode pairs arranged in the second direction, where i is a positive integer greater than 1, wherein each of the electrode pairs comprises a second electrode disposed at a first side of the first unit and a third electrode disposed at a second side of the first unit, a direction directing to the second side from the first side is the first direction, the second electrode is electrically connected with the third electrode;
the first lead wires have a one-to-one correspondence with the first electrodes, and the first lead wires are configured to connect the first electrodes with the bonding pads corresponding to the first electrodes; and
the second lead wires have a one-to-one correspondence with the electrode pairs, and the second lead wires are configured to connect the electrode pairs with the bonding pads corresponding to the electrode pairs;
wherein in any two adjacent electrode pairs, a gap between two adjacent second electrodes is opposite to one of the first electrodes in the first direction, and a gap between two adjacent third electrodes is opposite to the one of the first electrodes in the first direction;
wherein a sensing node is formed between the first electrode and the two adjacent electrode pair;
wherein two adjacent first electrodes in the first unit are disposed partially opposite to each other in the first direction.

2. The single-layer mutual-capacitance touch screen according to claim 1, wherein the single-layer mutual-capacitance touch screen comprises a first end and a second end, and a direction directing to the second end from the first end is the second direction;
the plurality of bonding pads are disposed at the first end, and are arranged in the first direction.

3. The single-layer mutual-capacitance touch screen according to claim 2, wherein for one of the sensing electrode groups:
the first lead wires are located at one side of the sensing electrode group; and
the second lead wires are located at the other side of the sensing electrode group.

4. The single-layer mutual-capacitance touch screen according to claim 3, wherein shape structures of two adjacent sensing electrode groups are mirror-symmetrical, or
two adjacent sensing electrode groups have a same shape structure.

5. The single-layer mutual-capacitance touch screen according to claim 1, wherein a part of the first one of the first electrodes is disposed opposite to the entirety of the first one of the second electrodes in the first direction, and is disposed opposite to the entirety of the first one of the third electrodes in the first direction; or
the entirety of the first one of the first electrodes is disposed opposite to a part of the first one of the second electrodes in the first direction, and is disposed opposite to a part of the first one of the third electrodes in the first direction.

6. The single-layer mutual-capacitance touch screen according to claim 1, wherein a part of the m-th one of the first electrodes is disposed opposite to the entirety of the i-th one of the second electrodes in the first direction, and is disposed opposite to the entirety of the i-th one of the third electrodes in the first direction; or
the entirety of the m-th one of the first electrodes is disposed opposite to a part of the i-th one of the second electrodes in the first direction, and is disposed opposite to a part of the i-th one of the third electrodes in the first direction.

7. The single-layer mutual-capacitance touch screen according to claim 1, wherein each of the first electrodes is in a shape of rectangle.

8. The single-layer mutual-capacitance touch screen according to claim 1, wherein each of the first electrodes comprises a first plane electrode extending in the second direction and a second plane electrode extending in the second direction;

the first plane electrode is connected with the second plane electrode, and a width of the second plane electrode is less than a width of the first plane electrode in the first direction; and two adjacent first electrodes are disposed partially opposite to each other in the first direction by the second plane electrodes of the two adjacent first electrodes.

9. The single-layer mutual-capacitance touch screen according to claim 8, wherein each of the first plane electrode and the second plane electrode is in a shape of rectangle.

10. An electronic device comprising a single-layer mutual-capacitance touch screen, wherein the single-layer mutual-capacitance touch screen comprises: a plurality of sensing electrode groups, a plurality of bonding pads, a plurality of first lead wires and a plurality of second lead wires; wherein the plurality of sensing electrode groups are disposed in a first direction in parallel, each of the sensing electrode groups comprises a first unit extending in a second direction and a second unit surrounding the first unit, wherein the first direction is perpendicular to the second direction;

the first unit comprises m first electrodes arranged in the second direction, where m is a positive integer greater than 1;

the second unit comprises i electrode pairs arranged in the second direction, where i is a positive integer greater than 1, wherein each of the electrode pairs comprises a second electrode disposed at a first side of the first unit and a third electrode disposed at a second side of the first unit, a direction directing to the second side from the first side is the first direction, the second electrode is electrically connected with the third electrode;

the first lead wires have a one-to-one correspondence with the first electrodes, and the first lead wires are configured to connect the first electrodes with the bonding pads corresponding to the first electrodes; and the second lead wires have a one-to-one correspondence with the electrode pairs, and the second lead wires are configured to connect the electrode pairs with the bonding pads corresponding to the electrode pairs;

wherein in any two adjacent electrode pairs, a gap between two adjacent second electrodes is opposite to one of the first electrodes in the first direction, and a gap between two adjacent third electrodes is opposite to the one of the first electrodes in the first direction;

wherein a sensing node is formed between the first electrode and the two adjacent electrode pair;

wherein two adjacent first electrodes in the first unit are disposed partially opposite to each other in the first direction.

11. The electronic device according to claim 10, wherein the single-layer mutual-capacitance touch screen comprises a first end and a second end, and a direction directing to the second end from the first end is the second direction;

the plurality of bonding pads are disposed at the first end, and are arranged in the first direction.

12. The electronic device according to claim 11, wherein for one of the sensing electrode groups:

the first lead wires are located at one side of the sensing electrode group; and the second lead wires are located at the other side of the sensing electrode group.

13. The electronic device according to claim 12, wherein shape structures of two adjacent sensing electrode groups are mirror-symmetrical, or two adjacent sensing electrode groups have a same shape structure.

14. The electronic device according to claim 10, wherein a part of the first one of the first electrodes is disposed opposite to the entirety of the first one of the second electrodes in the first direction, and is disposed opposite to the entirety of the first one of the third electrodes in the first direction; or the entirety of the first one of the first electrodes is disposed opposite to a part of the first one of the second electrodes in the first direction, and is disposed opposite to a part of the first one of the third electrodes in the first direction.

15. The electronic device according to claim 10, wherein a part of the m-th one of the first electrodes is disposed opposite to the entirety of the i-th one of the second electrodes in the first direction, and is disposed opposite to the entirety of the i-th one of the third electrodes in the first direction; or the entirety of the m-th one of the first electrodes is disposed opposite to a part of the i-th one of the second electrodes in the first direction, and is disposed opposite to a part of the i-th one of the third electrodes in the first direction.

16. The electronic device according to claim 10, wherein each of the first electrodes is in a shape of rectangle.

17. The electronic device according to claim 10, wherein each of the first electrodes comprises a first plane electrode extending in the second direction and a second plane electrode extending in the second direction;

the first plane electrode is connected with the second plane electrode, and a width of the second plane electrode is less than a width of the first plane electrode in the first direction; and two adjacent first electrodes are disposed partially opposite to each other in the first direction by the second plane electrodes of the two adjacent first electrodes.

18. The electronic device according to claim 17, wherein each of the first plane electrode and the second plane electrode is in a shape of rectangle.

* * * * *